United States Patent
Conflitti

(10) Patent No.: US 8,520,719 B2
(45) Date of Patent: Aug. 27, 2013

(54) MULTIPLE-MODE CORRELATOR

(75) Inventor: Paul A. Conflitti, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 12/787,253

(22) Filed: May 25, 2010

(65) Prior Publication Data

US 2011/0129001 A1 Jun. 2, 2011

Related U.S. Application Data

(60) Provisional application No. 61/182,486, filed on May 29, 2009.

(51) Int. Cl.
*H04B 1/00* (2006.01)

(52) U.S. Cl.
USPC ............................ 375/150; 375/142; 375/343

(58) Field of Classification Search
USPC .......................................... 375/142, 150, 343
See application file for complete search history.

(56) References Cited

U.S. PATENT DOCUMENTS

| | | | |
|---|---|---|---|
| 5,440,597 A | 8/1995 | Chung et al. | |
| 5,822,365 A | 10/1998 | Lee | |
| 6,717,977 B1 * | 4/2004 | Lee | 375/147 |
| 2004/0141574 A1 | 7/2004 | Akopian | |
| 2004/0183723 A1 * | 9/2004 | Bhatia et al. | 342/357.15 |
| 2004/0208236 A1 | 10/2004 | Fenton | |
| 2006/0271764 A1 * | 11/2006 | Nilsson et al. | 712/34 |
| 2007/0274374 A1 | 11/2007 | Abraham | |
| 2008/0137722 A1 | 6/2008 | Cherubini et al. | |

OTHER PUBLICATIONS

International Search Report and Written Opinion—PCT/US2010/036651, International Search Authority—European Patent Office—Feb. 24, 2011.
Partial International Search Report—PCT/US2010/036651—International Search Authority, European Patent Office, Oct. 22, 2010.
Schmid, A. et al., "Enabling Location Based Services with a Combined Galileo/GPS Receiver Architecture", ION GNSS 17th International Technical Meeting of the Satellite Division, Sep. 24, 2004, pp. 1468-1479, XP002525428.

* cited by examiner

*Primary Examiner* — David B Lugo
(74) *Attorney, Agent, or Firm* — Linda G. Gunderson

(57) ABSTRACT

Methods and apparatuses are provided for implementing a multiple-mode correlator within a receiver. The multiple-mode correlator may include at least one pre-multiplier portion and a plurality of correlation portions that selectively process multiply result signals from the pre-multiplier portion.

74 Claims, 5 Drawing Sheets

MULTIPLE-MODE CORRELATOR

RELATED PATENT APPLICATIONS

This patent application is related to claims priority to co-pending provisional U.S. Patent Application Ser. No. 61/182,486, filed May 29, 2009, titled "Multiple-Mode Correlator", which is incorporated in its entirety by reference herein.

BACKGROUND

1. Field

The subject matter disclosed herein relates to electronic devices and more particularly to methods and apparatuses for use in electronic devices that process signals using correlation.

2. Information

Navigation systems and devices and in particular satellite positioning systems (SPS) such as, for example, the Global Positioning System (GPS) and other like Global Navigation Satellite Systems (GNSS) are becoming more and more common. An SPS receiver, for example, may receive wireless SPS signals that are transmitted by a plurality of orbiting satellites of a GNSS. The SPS signals once received may be processed, for example, to determine a global time, an approximate geographical location, altitude, and/or speed associated for example with a device. It may be useful to acquire various different types of SPS signals.

SUMMARY

Methods and apparatuses are provided for implementing a multiple-mode correlator within a receiver and/or other like circuit and/or device.

By way of example, in accordance with certain aspects a method may be implemented which includes determining a plurality of multiply result signals in a pre-multiplier portion of a multiple-mode correlator based at least in part on multiplying input sample signals with code chip signals, selecting a first one of the plurality of multiply result signals for use by a first accumulator, and selecting a second one of the plurality of multiply result signals for use by a second accumulator, wherein the first and second accumulators are part of a correlation portion of the multiple-mode correlator. Here, for example, the code chip signals may be associated with one or more signals associated with one more navigation systems.

In accordance with certain other aspects, for example, an apparatus may be implemented which includes at least one multiple-mode correlator. The multiple-mode correlator may, for example, include a pre-multiplier portion that may be operatively enabled to determine a plurality of multiply result signals based at least in part on multiplying input sample signals with code chip signals, a correlation portion having a plurality of accumulators, and a selection portion coupled to the pre-multiplier portion and the correlation portion. Here, the selection portion may be operatively enabled to at least select a first one of the plurality of multiply result signals for use by a first accumulator, and a second one of the plurality of multiply result signals for use by a second accumulator.

In accordance with yet another aspect, an article of manufacture may be implemented which includes, for example, a computer-readable medium having computer implementable instructions stored thereon that are executable by one or more processing units of a computing device to operatively enable the computing device to operatively enable a pre-multiplier portion of a multiple-mode correlator to determine a plurality of multiply result signals based at least in part on multiplying input sample signals with code chip signal, and operatively enable a selection portion of the multiple-mode correlator to at least select a first one of the plurality of multiply result signals for use by a first accumulator, and a second one of the plurality of multiply result signals for use by a second accumulator. Here, the first and second accumulators may be part of a plurality of accumulators of a correlation portion of the multiple-mode correlator.

DETAILED DESCRIPTION

Figure 1:
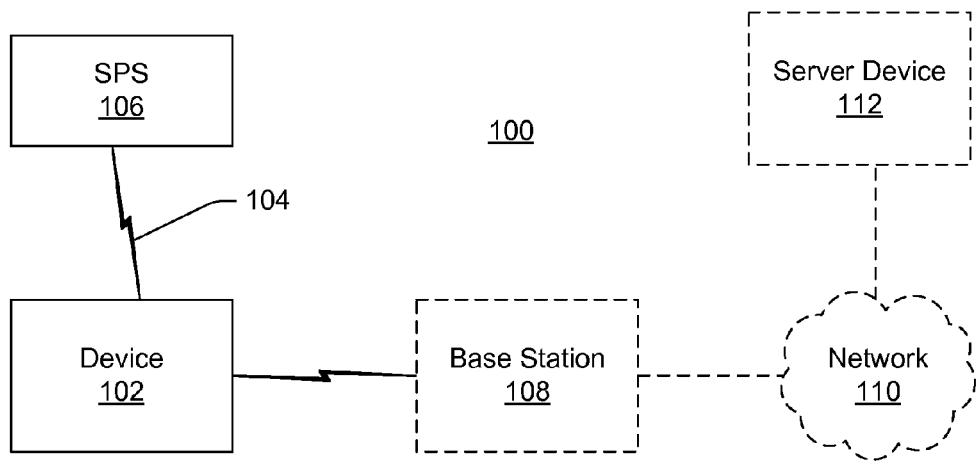
FIG. 1 is a schematic block diagram illustrating an example environment within which a device may include a receiver having a multiple-mode correlator in accordance with an implementation.

Non-limiting and non-exhaustive aspects are described with reference to the following figures, wherein like reference numerals refer to like parts throughout the various figures unless otherwise specified.

Introduction

As will described in greater detail in subsequent sections, in accordance with certain example implementations, methods and apparatuses may be provided for use in various types of devices that are enabled to acquire SPS signals through an SPS receiver. Such an SPS receiver may, for example, include a multiple-mode correlator as illustrated in the example implementations presented herein.

A multiple-mode correlator may, for example, be enabled to support the processing of various SPS signals from one or more SPS. A multiple-mode correlator may, for example, include a pre-multiplier portion and a correlator portion. A pre-multiplier portion may include one or more pre-multipliers, each of which may provide specific multiply result signals to the correlator portion. A pre-multiplier may, for example, be enabled to multiply certain input samples x (n) with certain code chips c (n). The correlator portion of the multiple-mode correlator may, for example, include a plurality of a selection portions and a corresponding plurality of accumulators. Each selection portion may, for example, be enabled to select a specific multiply result for a corresponding accumulator. An accumulator may, for example, accumulate multiply result signals over a correlation length to produce a correlation result.

Since the pre-multipliers may be enabled to selectively provide multiply result signals to a plurality of correlation portions, the multiple-mode correlator may, for example, be enabled to support a plurality of correlation modes. By way of example but not limitation, as described in greater detail in this description, the correlation modes may be associated with certain SPS (e.g., GNSS, etc.), certain SPS signals (e.g., GPS L1 C/A, GPS L5, etc.), and/or certain portions of certain SPS signals (e.g., pilot, data channels).

In accordance with an aspect of the present description, a multiple-mode correlator may reduce the amount of circuitry and/or other like processing resources through the use of a shared pre-multiplier portion. Thus, for example, the methods and apparatuses provided herein may be implemented in such a manner as to possibly reduce complexity, reduce size, reduce manufacturing costs, and/or reduce power consumption.

In accordance with an aspect of the present description, a multiple-mode correlator may enable a device to support the acquisition of a plurality of different SPS signals from one or more GNSS.

Example Environment

Attention is now drawn to FIG. 1, which is a block diagram illustrating an environment 100 that includes a device 102 that may be operatively enabled to acquire SPS signals 104 from at least one SPS 106. As shown in this example, device 102 may also (optionally) be operatively enabled to communicate over a wireless link to other devices and/or networked devices, such as, e.g., to a base station 108, network 110, and/or server device 112. Device 102 may be enabled to acquire SPS signal(s) 104 and process such to provide for position location determination and/or other like navigation capabilities.

Device 102 may be enabled to provide additional functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

In certain example environments, a position operation may be initiated by device 102 at a particular location. As such, a number of satellite signals, possibly with different properties, may be available for use in estimating the device's position. Assistance information may be provided to device 102 and employed so that particular satellites/signals may be designated as acquisition candidates. For example, assistance information may indicate the identity of a plurality of particular Global Positioning System (GPS) satellites that may be in view with signals on the same or different carrier frequencies, and/or a mix of satellites from different systems that may be in view. Code portions may be generated based on the acquisition candidates and processed using a multi-mode correlator as described herein.

Device 102 may receive SPS signals from various satellites or the like, which may be from a GPS, Galileo, GLONASS, Compass, or other like GNSS, a system that uses satellites from a combination of these systems, or any SPS developed in the future, each referred to generally herein as a "Satellite Positioning System" (SPS). Thus, by way of further example, in certain implementations device 102 may receive SPS signals associated with a Regional Navigation Satellite System, such as the Quasi-Zenith Satellite System (QZSS), the Indian Regional Navigational Satellite System (IRNSS), and/or the like.

Furthermore, the methods and apparatuses described herein may be used with position location determination systems that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Device 102, in certain example implementations, may include a device such as a cellular or other wireless communication device, personal communication system (PCS) device, personal navigation device, a vehicle mountable navigation device, a tracking device, Personal Information Manager (PIM), Personal Digital Assistant (PDA), laptop or other suitable device which may be capable of receiving wireless communications. A device may, for example, include devices which communicate with a personal navigation device (PND), such as by short-range wireless, infrared, wireline connection, or other connection—regardless of whether satellite signal reception, assistance data reception, and/or position-related processing occurs at the device or at the PND. Certain devices may, for example, include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above may also be considered a "device".

Device 102 may, in certain other example implementations, include a device that is not necessarily a mobile device. For example, device 102 may be enabled as a base station 108, server 112, and/or the like, enabled to acquire SPS signals 104 for various purposes (e.g., timing, assisting navigation, etc.).

The methodologies described herein may be implemented by various means depending upon the application. For example, these methodologies may be implemented in hardware, firmware, or a combination thereof a portion of which may be responsive to software instructions, for example. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Certain methodologies may be implemented with hardware responsive to software modules (e.g., procedures, functions, and so on) to perform the functions described herein. Any computer-readable medium tangibly embodying instructions may be used in implementing the methodologies described herein. For example, software codes may be stored in a memory 204 of device 102, and executed by a processing unit of a device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware responsive to modules, functions that implement methodologies or portions thereof may be stored on and/or transmitted over as one or more instructions or code on a computer-readable medium. A computer-readable medium may take the form of an article of manufacture. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium. The phrase "computer-readable medium" does not mean a transitory propagating signal.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Example Device with SPS Receiver

Figure 2:
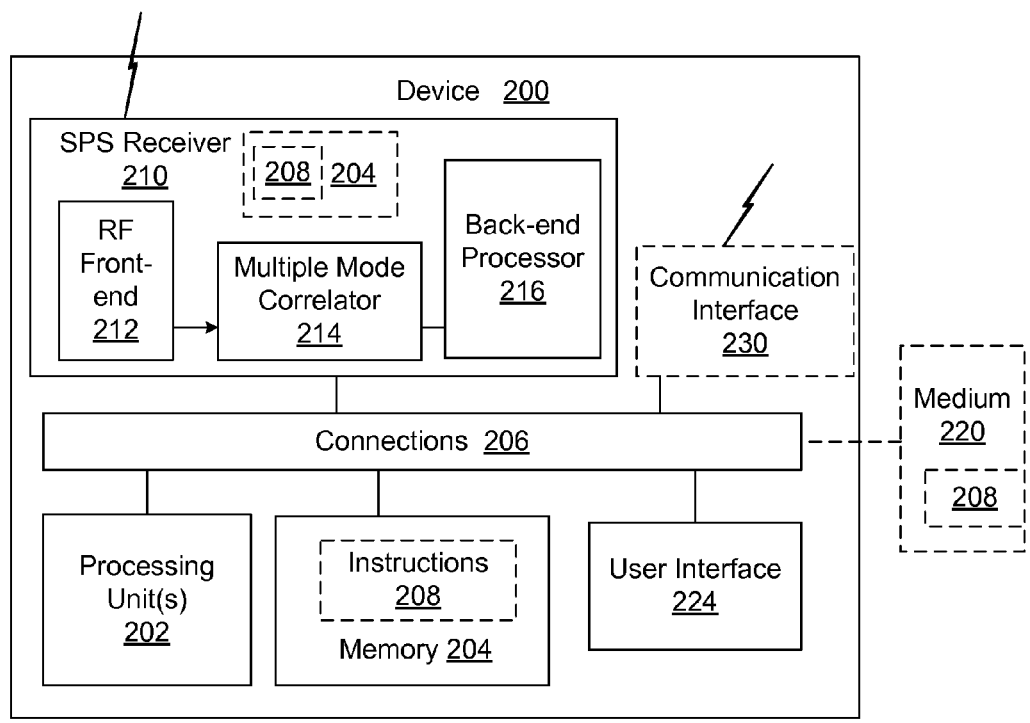
FIG. 2 is a schematic block diagram illustrating certain example features of a device having a receiver with a multiple-mode correlator in accordance with an implementation.

With this in mind, attention is drawn next to FIG. 2, which is a block diagram illustrating certain features of an exemplary device 200 that may, for example, be included device 102, server 112, and/or other devices, as applicable, to perform or otherwise support at least a portion of the example techniques described herein. Device 200 may, for example, include one or more processing units 202, memory 204, an SPS receiver 210, a user interface 224, a communication interface 230 (optional), which may be operatively coupled with one or more connections 206 (e.g., buses, lines, fibers, links, etc.).

Processing unit 202 may be implemented in hardware, software, or a combination of hardware and software. Thus, for example, processing unit 202 may represent one or more circuits configurable to perform at least a portion of a data computing procedure or process related to the operation of device 200. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer-readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example operations as described herein. Such computer implementable instructions 208 may also be provided by memory 204, which as also illustrated in this example may be also present in some form within SPS receiver 210.

SPS receiver 210 may, for example, include an RF front-end 212, a multiple-mode correlator 214, and a back-end processor 216. RF front-end 212 may, for example, include one or more receiver circuits enabled to acquire (e.g., receive, demodulate, down-convert, sample, etc.) one or more SPS signals 104 from one or more SPS 106 (see FIG. 1). Thus, RF front-end 212 may be enabled to provide input sample signals (e.g., x(n) and/or other like data that may be used to establish x(n)) to multiple-mode correlator 214. Multiple-mode correlator 214 may, for example, include a pre-multiplier portion that may be enabled to multiply certain input sample signals x(n) with certain code chip signals c(n) to produce a plurality of multiply results. Here, for example, code chip signals c(n) may be generated by one or more code generators. Multiple-mode correlator 214 may, for example, include one or more correlator portions, each of which may include one or more selector portions enabled to select certain multiply result signals to be processed by one or more accumulators. Multiple-mode correlator 214 may, for example, produce correlation results, which may be further processed in some manner by back-end processor 216 and/or other like circuitry.

Communication interface 230 (optional) may, for example, include a receiver and a transmitter, and/or combination thereof. As shown, communication interface 210 may be operatively enabled to communicate over a wireless communication link.

Figure 3:
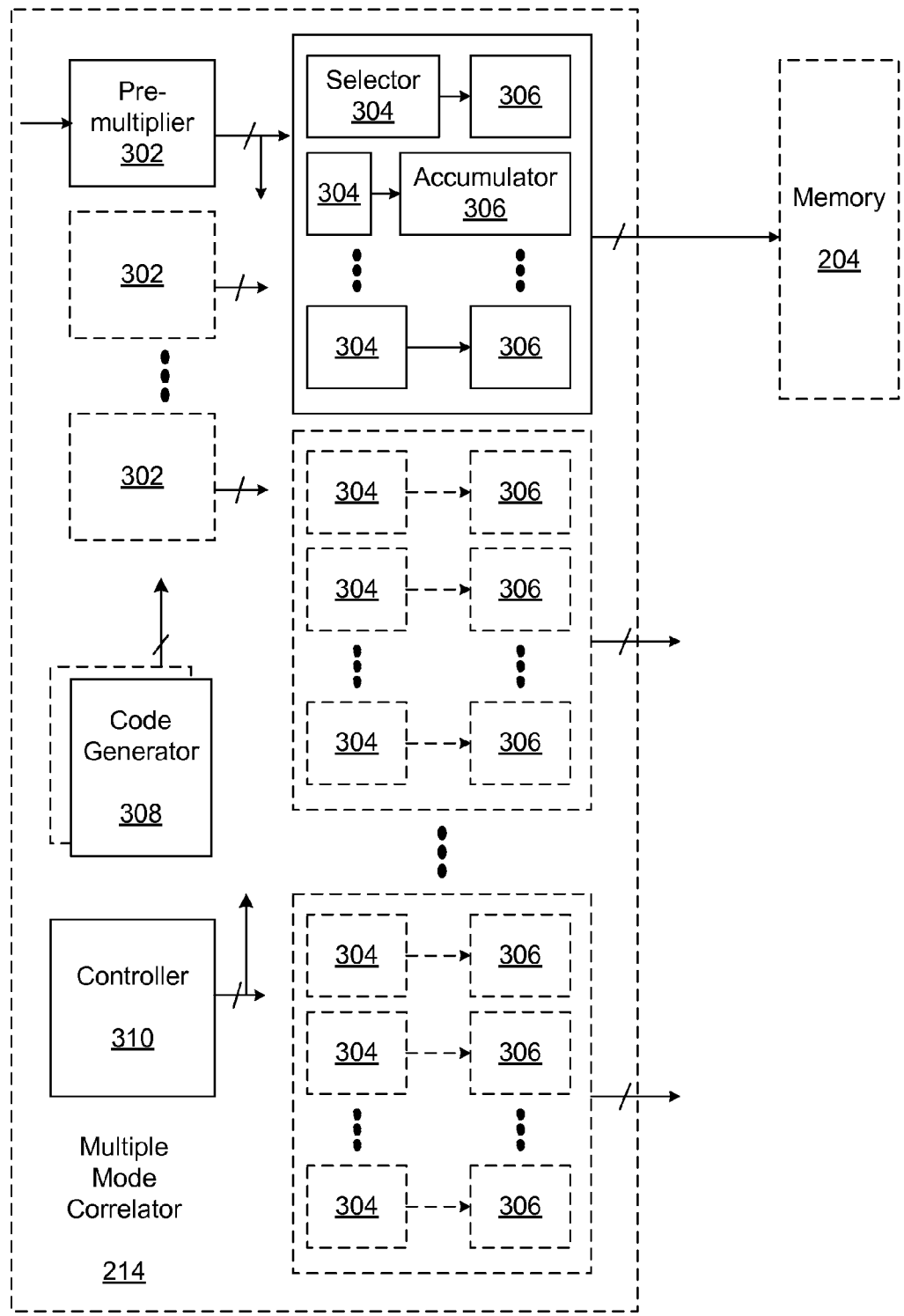
FIG. 3 is a schematic block diagram illustrating certain example features of a multiple-mode correlator in accordance with an implementation.

Reference is made next to FIG. 3, which illustrates an example of multiple-mode correlator 214. As shown, multiple-mode correlator 214 may include one or more pre-multipliers 302 that are enabled to receive or otherwise access certain input sample signals x(n) and receive or other wise access certain code chip signals c(n) and based, at least in part thereon, and provide or otherwise output a plurality of multiply results. Here, for example a plurality of code generators 308 may be enabled to generate the desired code chip signals c(n).

Multiple-mode correlator 214 may include a plurality of selectors 304. Each selector 304 may be associated with at least one accumulator 306. A selector 304 may, for example, be enabled to select one of the multiply result signals for use by an accumulator 306, for example, in response to an input from a controller 310. Controller 310 may, for example, be enabled to configure and possibly reconfigure the operation of certain portions of multiple-mode correlator 214. For example, controller 310 may operatively establish multiple-mode correlator 214 to support one or more correlation modes. Thus, in certain example implementations controller 310 may be enabled to provide input and/or otherwise control in some manner one or more of the pre-multipliers 302, selectors 304, accumulators 306, code generators 308, and/or possibly memory 204. Controller 310 may, for example, be responsive to and/or otherwise interact with one or more other components and/or features of device 102. For example, controller 310 may be operatively enabled to respond to inputs from processor 202, RF front-end 212, back-end processor 216, instructions 208 (see FIG. 2), and/or the like.

As further illustrated in the example in FIG. 3, accumulators 306 (and possibly corresponding selectors 304) may be operatively grouped together. For example, accumulators 306 may be partitioned into a plurality of groups of accumulators based at least in part on a plurality of correlation modes. In one example, which is illustrated in greater detail below, at least two groups of accumulators may be established, one for each of at least two correlation modes. In accordance with certain example correlation modes, a pre-multiplier 302 may process at least four of the input sample signals x(n) per chip, each of the input sample signals x(n) may be split into at least four sample phases, and each of the two groups of accumulators may be enabled (e.g., at least by the selectors) to independently process one of the four sample phases. In certain example implementations, for at least one of the groups of accumulators the multiply result signals may be selectively staggered in time (e.g., at least by the selectors) to allow each accumulator within the group to process different sets of input sample signals x(n).

Figure 4:
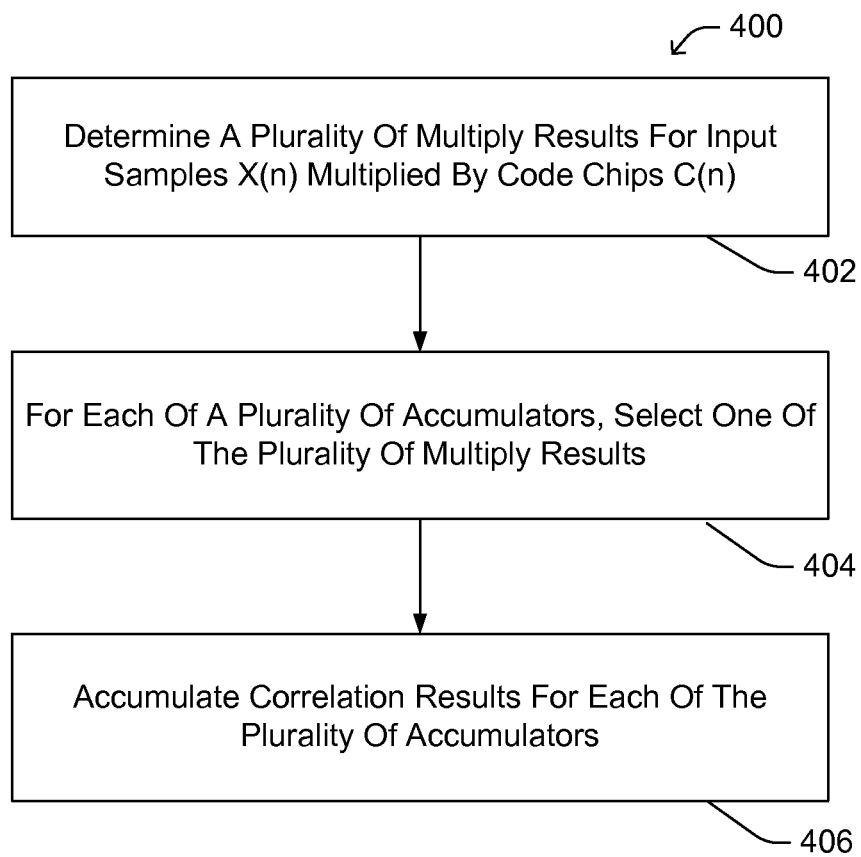
FIG. 4 is a flow-diagram illustrating an exemplary method that may be implemented in a multiple-mode correlator in accordance with an implementation.

Attention is drawn next to FIG. 4, which illustrates a method 400 that may be enabled in whole or part by multiple-mode correlator 214 (FIG. 2). At block 402, a plurality of multiply result signals may be determined, for example by at least one pre-multiplier 302, for input sample signals x(n) multiplied by code chip signals c(n). At block 404, multiply result signals may be selected, for example at least in part by selector(s) 306, for each of a plurality of accumulators 306. At block 406, correlation results may be accumulated, for example, over a correlation period associated with a correlation mode using each accumulator 306.

The following sections provide some additional examples of a multiple-mode correlator 214 and certain example implementations associated with different example SPS signals and associated correlation modes. These are intended only as examples. Claimed subject matter should not therefore be limited by these examples. Those skilled in the art will recognize that the techniques provided herein may be useful in other implementations as well.

Example GNSS Signals and Correlation Modes

With this in mind, some example correlation modes and/or code generators are described which may be operatively supported by multiple-mode correlator 214. More specifically, some example GPS L1 and L5 example implementations are provided. Those skilled in the art should, however, upon reading this description recognize that the exemplary techniques provided herein may be enabled for other GNSS, GNSS signals, etc. Thus, claimed subject matter is not intended to be limited by these example signals and/or modes. In the example implementations described below, several hundred (e.g., 256) accumulators may be employed to allow for hundreds of correlation results of which one or more of samples (e.g., four) may be processed per cycle. In certain example implementations, a multiple-mode correlator may include additional accumulator(s) enabled to process a data channel in parallel with a pilot channel. Here, for example, a correlation time offset relative to the pilot channel correlations may be programmably enabled.

Example Multiple-Mode Correlator

Figure 5:
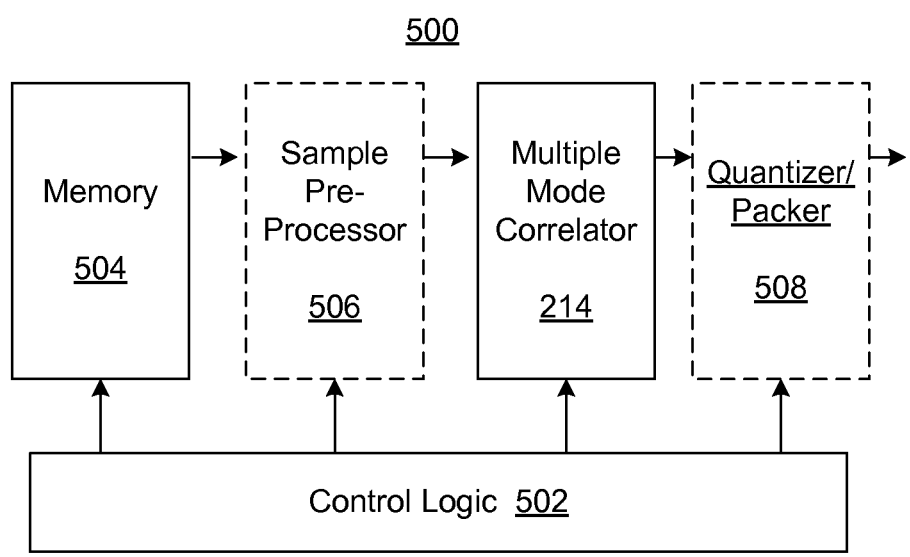
FIG. 5 is a schematic block diagram illustrating certain features an exemplary multiple-mode correlator in accordance with an implementation.

FIG. 5 illustrates an example multiple-mode correlator implementation 500 that includes control logic 502, memory 504, a sample pre-processor 506, a multiple-mode correlator 214, and a quantizer/packer 508.

Sample pre-processor 506 (which may be optional) may be enabled to access or otherwise receive sampled data from memory 504. The sampled data may be provided to memory 504, for example, from RF front-end 212 (FIG. 2) or other like circuits. Sample pre-processor 506 may, for example, be enabled to perform frequency conversion and/or sample interpolation as may be desired to support subsequent correlation tasks. Here, for example, sample preprocessor 506 may be enabled to establish samples x(n). In other implementations, samples x(n) may already be available in memory 504.

Thus, if needed, in certain implementations sample pre-processor 506 may be enabled to perform SV Doppler correction and any common frequency offset. Sample pre-processor 506 may be enabled to perform interpolation between consecutive samples, for example, effectively delaying the sample stream by a sub-sample-period duration. Thus, sample pre-processor 506 may be enabled to allow for fine adjustment of the sampling phase for time Doppler correction and code phase tracking. For example, fine resolution may be possible by dithering between different delay settings. The effective delay amount may be based on the duty cycle of the dither, which may be selected by control logic 502, for example.

Sample pre-processor 506 may, for example, be enabled to process multiple sample phases in parallel. The sample phases may be indicated by subscript p=0, 1, 2 and 3, such that the outputs may include $x_0(n)$, $x_1(n)$, $x_2(n)$ and $x_3(n)$, where n may be the sample index. The selected coefficient subset may be defined as $[c_0, c_1, c_2, c_3, c_4, c_5]$. Hence, a mathematical description of the interpolation that may be provided by sample pre-processor 506 for the four sample phases is:

$$x_0(n) = c_0 \cdot b_0(n) + c_1 \cdot b_1(n) + c_2 \cdot b_2(n) + c_3 \cdot b_3(n) + c_4 \cdot b_0(n+1) + c_5 \cdot b_1(n+1)$$

$$x_1(n) = c_0 \cdot b_1(n) + c_1 \cdot b_2(n) + c_2 \cdot b_3(n) + c_3 \cdot b_0(n+1) + c_4 \cdot b_1(n+1) + c_5 \cdot b_2(n+1)$$

$$x_2(n) = c_0 \cdot b_2(n) + c_1 \cdot b_3(n) + c_2 \cdot b_0(n+1) + c_3 \cdot b_1(n+1) + c_4 \cdot b_2(n+1) + c_5 \cdot b_3(n+1)$$

$$x_3(n) = c_0 \cdot b_3(n) + c_1 \cdot b_0(n+1) + c_2 \cdot b_1(n+1) + c_3 \cdot b_2(n+1) + c_4 \cdot b_3(n+1) + c_5 \cdot b_0(n+2)$$

where in this example $b_p(n+k)$ may be time advanced by 4*k samples (or k sample vectors of four elements) with respect to $b_p(n)$. Thus multiple consecutive samples may be used to calculate the results. Those skilled in the art should recognize that the real and imaginary components of $b_p(n)$ may be processed independently and in the same way with the same coefficient subset, for example.

Multiple mode correlator 214 may, for example, be enabled to perform correlation tasks on several types of SPS (e.g., GNSS) signals. In the examples that follow, multiple mode correlator 214 may be configured and/or reconfigured based at least in part on two or more different correlation modes.

Figure 6:
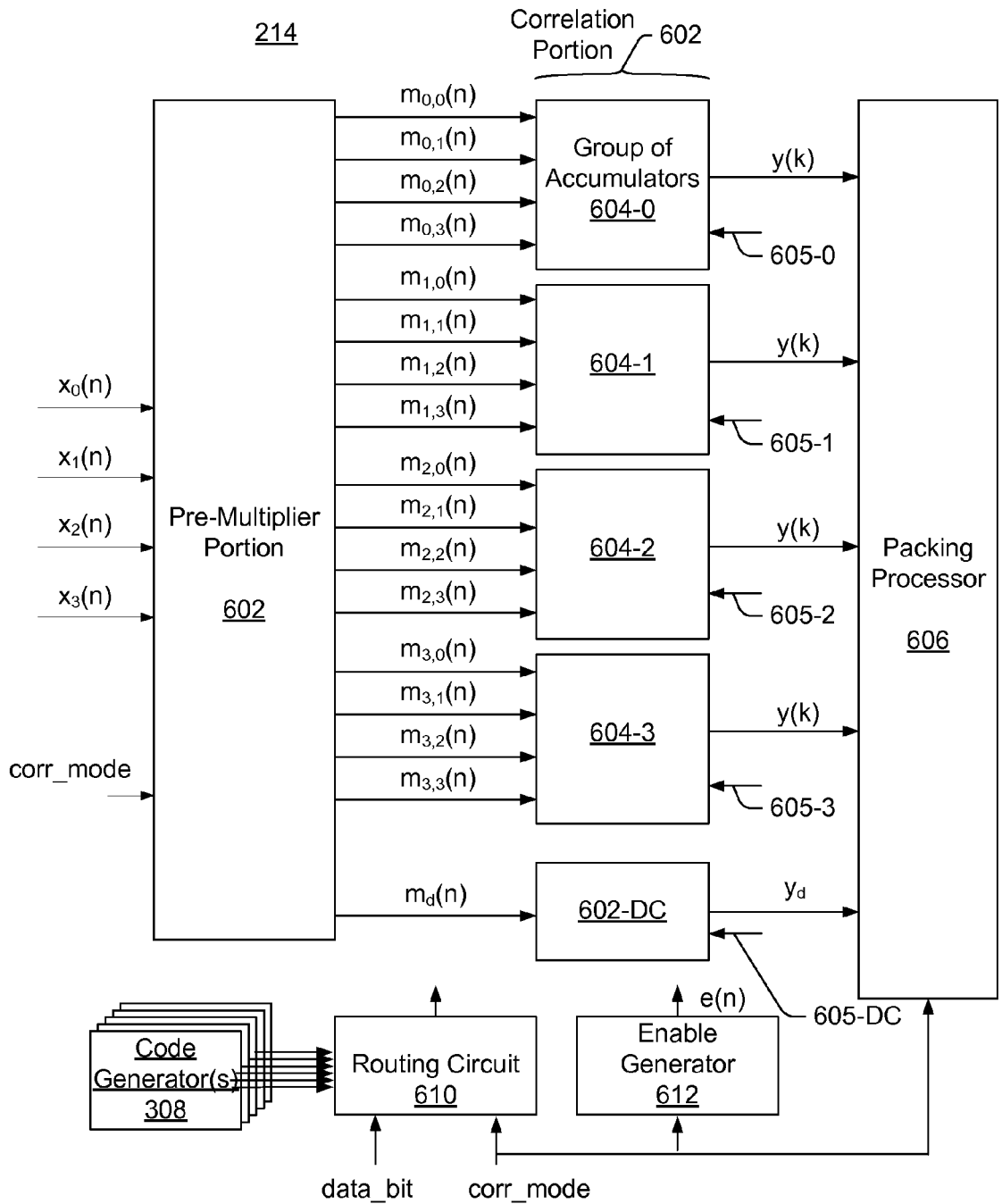
FIG. 6 is a schematic block diagram illustrating certain features an exemplary multiple-mode correlator, for example, as in FIG. 5, in accordance with an implementation.

In certain example implementations, multiple mode correlator 214 may include the capability to process at least two samples in parallel on each clock cycle. In certain example implementations multiple mode correlator 214 may also be enabled to process pilot and/or data channels. Indeed, multiple mode correlator 214 may be enabled to process pilot and data channels concurrently in some implementations. In certain example implementations, the results of multiple mode correlator 214 may be further processed (optional) by a quantizer/packer 508 which may be enabled to provide for efficient data handling and/or memory usage, for example FIG. 6 is a block diagram illustrating still another example implementation of portions of a multiple-mode correlator 214. A short description of certain illustrated features within an example multiple-mode correlator 214 is presented, and followed later with some additional details.

In this example implementation, all of the possible multiply result signals may be determined for the input sample signals x(n) multiplied by the code chip signals c(n) in a pre-multiplier portion 600. As a result there should be a different set of multiply result signals associated with each of the supported/desired correlation modes. A correlator portion 602 (e.g., a selector and at least one accumulator) may then select an appropriate multiply result based on the code chips.

In the example implementation in FIG. 6, there are 256 complex correlator portions which are partitioned into four groups of accumulators 604-0, 604-1, 604-2, and 604-3, each group having 64 correlator portions. The organization of such groups may be based at least in part on the correlation mode(s). For example, when processing at a rate of four samples per chip (sometimes denoted as spc), the input sample signals x(n) may be split into four sample phases and each group may independently process one of the four sample phases.

Figure 7:
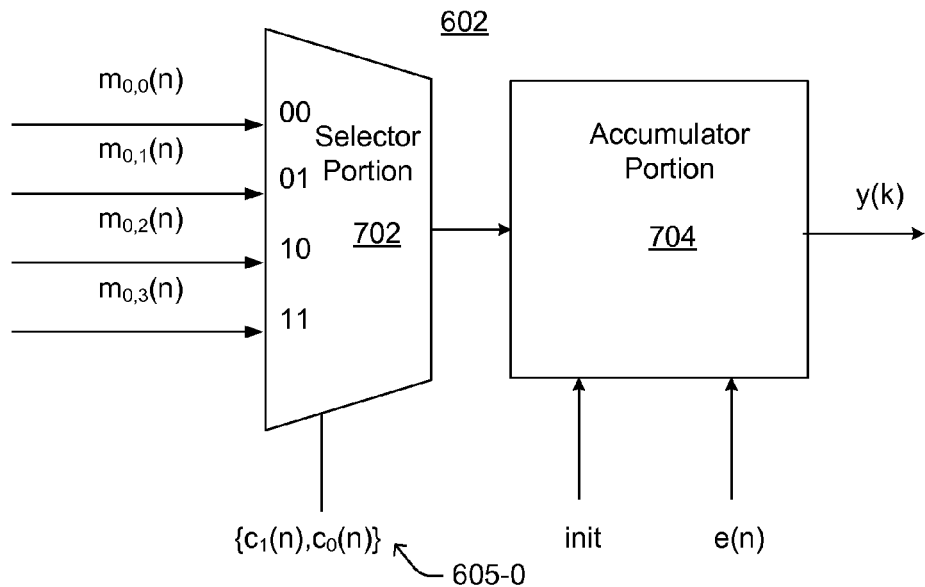
FIG. 7 is a schematic block diagram illustrating certain further features an exemplary multiple-mode correlator, for example, as in FIG. 6, in accordance with an implementation.

FIG. 7 presents an example implementation of one of the correlator portions as may be included in group 604-0. Here, in this example, the correlator portion 602 includes a 4-input selector 702 and an accumulator 704. On each clock cycle, one of the four multiply result signals m(n) may be selected based on code chip(s) c(n) as received at interface 605-0. The selected multiply result signals may then be accumulated by accumulator 704 over the corresponding correlation length. Within group 604-0, in this example implementation, there may be a total of 512 such correlation portions.

Returning to FIG. 6, as illustrated in certain implementations, there may be at least one additional (complex) correlator portion 604-DC that may be dedicated to processing a data channel. Correlator portion 604-DC may be used, for example, when a pilot channel may be processed by some of the group-based correlator portions. Therefore, the same correlation task may be used to process both channels independently within multiple-mode correlator 214.

In this example, code generators 308 may be provided for the GNSS signals that are supported by multiple-mode correlator 214. In some modes, separate code generators may be provided for pilot and data channels and enabled to operate concurrently. As mentioned, in some modes, two (or more) consecutive chips may be generated in each cycle by certain code generators.

The chip sequence may be selected and routed to correlator portions in a specific order which may be dependent on the mode. There may be also an option of pre-multiplying a data bit by a chip sequence, and then the result may be applied to the correlator portions.

An accumulator enable generator 612 may be used to create enable signals e(n) for all the correlator portions. These enable signals e(n) are input to the correlator portion/groups of accumulators as represented by inputs 605-0, 605-1, 605-2, 605-3 and 605-DC. The enable signals e(n) may be dependent on the correlation mode. Certain enable signals e(n) may be staggered in time with respect to one another to allow each correlator portion to process a different set of samples. The number of correlator portions that may be enabled in a task may be software programmable. In addition, the timing of enable signal e(n) 605-DC may be programmable. Additionally, a routing circuit 610 may route signals, such as, code and data bit signals, as applicable.

The accumulated correlation results may be packed in packing processor 606 and/or the like in the proper manner (e.g., size, order, etc.) as may be desired for storage in memory.

Several example correlation modes will now be described in greater detail to further illustrate the processes and functions that may be implemented or otherwise operatively enabled in a multiple-mode correlator, such as, for example a multiple mode correlator 214.

Example L1 Correlation Modes

An example correlation mode includes the L1 correlation modes that may support certain GNSS signals, such as: GPS L1-C/A, QZSS L1-C/A, SBAS L1-C/A (e.g., WAAS, EGNOS, and MSAS), GPS L2 with C/A code, and/or L1-C/A diversity channel. The commonalties between all these signals are BPSK chip modulation, chip rate of 1.023 Mcps, and primary code lengths of 1023 chips. The data rates for SBAS signals may be as high as 500 bps, while the other signals may be 50 bps.

Two example L1 correlation modes are described below, namely, one with baseband sample rates of 2 spc (referred to as L1_2) and another one with baseband sample rates of 1 spc (referred to as L1_1). The processing may be similar for these two exemplary L1 modes and they use the same code generation method.

The general equation for correlation of a complex sample sequence x(n) with code sequence c(n) at 2 spc rate and over 1023 chip length is $$y(k) = \sum_{m=0}^{1022} c(m) \cdot [x(2m+k) + x(2m+1+k)]$$

where the variable k may be the correlator number and it has a range of k=0, 1, ..., K−1. In this example design K may be limited to 256. The code chip index may be defined as m=0, 1, ..., L−1, where the code length L may be equal to 1023 in L1 mode. The sample index may be based on m, and the range may be defined as 0, 1, ..., N−1, where N=K+2L−1. The code coefficient values of c(m) may be ±1; the code generator digital values of 1 and 0 may map to coefficient values of +1 and −1, respectively.

In the equation above, y(k) and x(m) are complex values and c(m) may be real. Notice the I and Q components of the sample sequence, $x_i(m)$ and $x_q(m)$, may be processed independently, and in both L1 correlation modes, they may both be correlated with the same code sequence. Thus the equation may be separated into two independent equations for I and Q (e.g., substitute $y_i(k)$ for y(k) and $x_i(m)$ for x(m)).

A description of the correlation implementation may be as follows: for the first correlator (k=0), the first two samples of x(m) may be multiplied by the first code bit c(0), the second pair of samples may be multiplied by the second code bit c(1) and added to the sum, and so on until the 1023rd pair of samples have been multiplied by the last code bit c(1022) and added to the sum. For the other correlators (k=1, 2, . . . , K−1), the sample sequences may simply be offset by k samples. This produces K correlation values with time spacing of one sample (one-half chip period at 2 spc rate).

The general correlation equation above represents an optimum matched filter for the 1.0 ms spread spectrum symbol of the L1 signal. This may be factored into a matched filter for the code sequence cascaded with a matched filter for the chip modulation. In this example, the later operation will be referred to as the chip matched filter (CMF). The CMF for a 2 spc BPSK modulated signal may be defined as $H_m(z)=1+z^{-1}$. In certain implementations, a CMF may be performed in baseband processing, prior to correlation, so it may be factored out of the equation above and thus it reduces to $$y(k) = \sum_{m=0}^{1022} c(m) \cdot x(2m+k)$$

Thus the number of computations for y(k) may be reduced by half if the CMF may be done prior to correlation.

Notice that the even numbered correlators only process the even numbered samples of x(n), and the odd correlators only process the odd samples. This leads to the next permutation of the equation. One may now commute (split) the samples into two separate sets. The two sample sets may be defined as first phase $x_0(n)$ and second phase $x_1(n)$, with $x_0(n)=x(2n)$ and $x_1(n)=x(2n+1)$, where n=0, 1, . . . , N/2−1. The index n for the half-rate sets may be equivalent to 2m in the full sample set. Thus, the correlations performed on the two sets may be expressed as $$y(2k') = \sum_{n=0}^{1022} c(n) \cdot x_0(n+k')$$

$$y(2k'+1) = \sum_{n=0}^{1022} c(n) \cdot x_1(n+k')$$

where the correlator index range may be redefined as k'=0, 1, . . . , K/2−1. This still leads to K correlators total between the two sets.

To reduce the number of processing cycles in such a correlation implementation, one may multiply-add two consecutive samples and code bits in each iteration of the sum. This reduces the number of iterations to 512, instead of 1023, which translates into ~50% reduction in the number of cycles to compute a correlation. Therefore, several more correlation tasks may be performed in the same time period. For the even and odd numbered correlators, this may be mathematically expressed as $$y(2k') = \sum_{n=0}^{511} c(2n) \cdot x_0(2n+k') + c(2n+1) \cdot x_0(2n+1+k')$$

$$y(2k'+1) = \sum_{n=0}^{511} c(2n) \cdot x_1(2n+k') + c(2n+1) \cdot x_1(2n+1+k')$$

Notice these equations perform correlation over 1024 chips, not the intended 1023 chips. The code index range may be extended to n=0, 1, . . . , L. On the last summation, the code index reaches 1023, which is mapped to code bit c(0) because the code repeats every 1023 chips. Thus, c(0) may be multiplied by the 1024th sample. Such a longer correlation may, for example, be accounted for in a subsequent detection implementation. Another option may be to add logic to every correlator that will allow nulling of the last multiply-add operation.

Next, one may define an equation that may be implemented, e.g., in hardware and/or the like. As previously stated, multiple-mode correlator 214 may have the capability to process four samples in parallel per clock cycle. The four sample sets may be defined as $x_0(n)=x(4n)$, $x_1(n)=x(4n+1)$, $x_2(n)=x(4n+2)$, and $x_3(n)=x(4n+3)$, where n=0, 1, . . . , N/4−1. The sample phases may still be separated by one-half chip period (2 spc rate), and thus the four phases span a 2 chip duration. In the even correlator equation above, the second product term with $x_0$ may be replaced with $x_2$, and likewise in the odd correlator equation the second product term with $x_1$ may be replaced with $x_3$. One may also define a time index advanced version of $x_0(n)$ and $x_1(n)$ as $x_0(n+1)$ and $x_1(n+1)$. Hence, the correlator may have access to six consecutive samples per iteration (note the example design may support up to eight samples). Based on this new definition, one may rewrite the equations for implementation as $$y(4k'') = \sum_{n=0}^{511} c(2n) \cdot x_0(n+k'') + c(2n+1) \cdot x_2(n+k'')$$

$$y(4k''+1) = \sum_{n=0}^{511} c(2n) \cdot x_1(n+k'') + c(2n+1) \cdot x_3(n+k'')$$

$$y(4k''+2) = \sum_{n=0}^{511} c(2n) \cdot x_2(n+k'') + c(2n+1) \cdot x_0(n+1+k'')$$

$$y(4k''+3) = \sum_{n=0}^{511} c(2n) \cdot x_3(n+k'') + c(2n+1) \cdot x_1(n+1+k'')$$

where the correlator index may be redefined as k''=0, 1, . . . , K/4−1.

The general techniques, notion convention and terminology used in the above example may be applied for other example correlation modes as described below. However, for the sake of brevity, some of the obvious intermediate steps will be skipped over. For the details on such, the reader is referred back to this preceding example description.

Example L1 Correlator Implementation for Two Samples/Chip

The above example correlation operations will now be mapped on to multiple-mode correlator 214 of FIG. 6 and FIG. 7. First, the code multiply operations are defined. In pre-multiplier portion 600 every possible result of an x(n) by c(n) multiply operation may be computed based on two consecutive chips from code generator 308. Selector portions 702 may select one of the four possible multiply results, $m_{b,0}(n)$, $m_{b,1}(n)$, $m_{b,2}(n)$, and $m_{b,3}(n)$ for each accumulator 704 in terms of sample phases $x_0(n)$, $x_1(n)$, $x_2(n)$, and $x_3(n)$, and code chips $c_{b,0}(n)$, $c_{b,1}(n)$, where b may be the group number of 0, 1, 2, or 3. One example convention for the selection of the $m_{b,c}(n)$ value based on code chips is When $c_{b,1}(n)=0$ and $c_{b,0}(n)=0$, then select $m_{b,0}(n)$
When $c_{b,1}(n)=0$ and $c_{b,0}(n)=1$, then select $m_{b,1}(n)$
When $c_{b,1}(n)=1$ and $c_{b,0}(n)=0$, then select $m_{b,2}(n)$
When $c_{b,1}(n)=1$ and $c_{b,0}(n)=1$, then select $m_{b,3}(n)$
The code chip assignment for groups 0 through 3 are
$c_{0,0}(n)=c(2n)$
$c_{0,1}(n)=c(2n+1)$
$c_{1,0}(n)=c(2n)$
$c_{1,1}(n)=c(2n+1)$
$c_{2,0}(n)=c(2n)$
$c_{2,1}(n)=c(2n+1)$
$c_{3,0}(n)=c(2n)$
$c_{3,1}(n)=c(2n+1)$ In an L1_2 mode, each accumulator group may process different sample phases. For example, group 604-0 may process sample phases $x_0(n)$ and the sample phase advanced by two samples, which may be $x_2(n)$. In addition, groups 604-1, 604-2 and 604-3 may, for example, process $x_1(n)$ & $x_3(n)$, $x_2(n)$ & $x_0(n+1)$, and $x_3(n)$ & $x_1(n+1)$, respectively. As mentioned, a code chip of logic 0 may be mapped to multiply by −1, and a code chip of logic 1 may be mapped to multiply by +1. Given the above definitions and the implementation equations, all the $m_{b,c}(n)$ terms for the L1 mode at 2 spc may be defined as:

$m_{0,0}(n)=-x_2(n)-x_0(n)$
$m_{0,1}(n)=-x_2(n)+x_0(n)$
$m_{0,2}(n)=+x_2(n)-x_0(n)$
$m_{0,3}(n)=+x_2(n)+x_0(n)$
$m_{1,0}(n)=-x_3(n)-x_1(n)$
$m_{1,1}(n)=-x_3(n)+x_1(n)$
$m_{1,2}(n)=+x_3(n)-x_1(n)$
$m_{1,3}(n)=+x_3(n)+x_1(n)$
$m_{2,0}(n)=-x_0(n+1)-x_2(n)$
$m_{2,1}(n)=-x_0(n+1)+x_2(n)$
$m_{2,2}(n)=+x_0(n+1)-x_2(n)$
$m_{2,3}(n)=+x_0(n+1)+x_2(n)$
$m_{3,0}(n)=-x_1(n+1)-x_3(n)$
$m_{3,1}(n)=-x_1(n+1)+x_3(n)$
$m_{3,2}(n)=+x_1(n+1)-x_3(n)$
$m_{3,3}(n)=+x_1(n+1)+x_3(n)$

Again, the I and Q components may be processed independently and in the same way; all of the $m_{b,c}(n)$ may have identical I and Q expressions. The sample values may be 6-bits each. Since two may be added together with a 7-bit result, one may scale the result by 0.5 before applying them to the correlator portions. This may be done with an unbiased round towards zero, for example.

Each correlator portion may, for example, perform accumulation over 512 cycles. The correlator portions may operate over different time intervals, each offset by one sample with respect to another. A first correlation may be aligned to the start of the sample stream, and the code sequence applied to each correlator portion may be aligned to a correlation interval. In L1_2 mode, all four groups may use the same set of enable signals. The enable signal for each correlator within the groups may be mathematically represented with a unit step sequence u(n) as $e_{0,k''}(n)=u(n-k'')-u(n-k''-512)$
$e_{1,k''}(n)=u(n-k'')-u(n-k''-512)$
$e_{2,k''}(n)=u(n-k'')-u(n-k''-512)$
$e_{3,k''}(n)=u(n-k'')-u(n-k''-512)$ where the correlator index within each group may be defined as $k''=0, 1, \ldots, K/4-1$. As before, the variable K may be the number of correlator portions that are enabled in a task; in this example, such may be programmable up to 256 for each task. The definition of the unit step sequence may be:

$u(n)=1$ when $n>0$, and $u(n)=0$ when $n<0$.

The accumulator enable signals may be implemented with a pulse generator and a 1-bit tapped delay line (TDL). The generator may produce a pulse of 512 cycles in length, which may be fed to a TDL with 64 taps. The accumulators may be connected to the different taps of the TDL. When the last enable signal may be done, it may indicate that a correlation process is completed. The total number of cycles to perform K correlations may, for example, be 512+K/4. So for K=256 this leads to 576 cycles.

A similar TDL method may be used for the code chip inputs to each correlator portion within a group. For each correlator portion the code chips may be delayed so that they align with the enable signal (e.g., the first pair of chips may be applied on the first cycle of the enable signal, and so on).

After the correlations are completed, the correlator results may be saved to memory, for example, in a correct time sequence order. In certain implementations, it may be useful to specify a time offset of each correlator portion within the four groups. Then the results may be interlaced and/or concatenated to put them in right time order in packing processor 606 and/or the like. For the L1 mode at 2 spc rate, the correlator index numbering order for the four groups may be Group 504-0 may be $y(0), y(4), \ldots, y(252)$
Group 504-1 may be $y(1), y(5), \ldots, y(253)$
Group 504-2 may be $y(2), y(6), \ldots, y(254)$
Group 504-3 may be $y(3), y(7), \ldots, y(255)$ Another operation may be to order the correlator results from $k=0, 1, \ldots, K-1$, where K may be the desired number of correlator per task. In L1_2 mode, this may simply require interlacing the results of the four groups. Many of the correlation modes share the same ordering and result memory organization.

Example L1 Correlation Implementation for One Sample/Chip

In this next section an example correlation implementation for L1 signal at a sample rate of 1 spc (L1_1 mode) is presented. In this case the CMF may be undefined since there may be only one sample per chip. Thus the general correlation expression may be $$y(k) = \sum_{n=0}^{1022} c(n) \cdot x(n+k)$$

This produces K correlation values with time spacing of 1 chip period, which spans twice the time range of the 2 spc mode. As in the 2 spc mode, the variable K may be limited to 256 and the code length L=1023. Thus the total number of samples processed may be N=L+K−1.

Again, considering a method of multiply-adding two consecutive samples and code chips in each iteration of the sum, a correlation expression may be shown to be $$y(k) = \sum_{n=0}^{511} c(2n) \cdot x(2n+k) + c(2n+1) \cdot x(2n+1+k)$$

As in the L1_2 mode, this expression indicates that 1024 samples and chips are processed in each correlation, instead of 1023. The benefit may be the number of iteration may be reduced by half, and thus more correlation capacity may be available. The code chip c(1023) may be equal to c(0). The total number of samples processed may be N=L+K.

For implementation there may be multiple samples available per cycle. In this mode, the sample sequence may be again partitioned into four sample sets which are defined as $x_0(n)=x(4n)$, $x_1(n)=x(4n+1)$, $x_2(n)=x(4n+2)$ and $x_3(n)=x(4n+3)$, where n=0, 1, ..., N/4−1. The four sample vector may be updated on every other cycle. The correlator portions may process two samples per cycle, one set of two on even cycles and the other two samples on odd cycles. The equations for implementation may be $$y(2k') = \sum_{even, n=0}^{510} [c(2n) \cdot x_0(n+k') + c(2n+1) \cdot x_1(n+k')] +$$

$$\sum_{odd, n=1}^{511} [c(2n) \cdot x_2(n+k') + c(2n+1) \cdot x_3(n+k')]$$

$$y(2k'+1) = \sum_{even, n=0}^{510} [c(2n) \cdot x_1(n+k') + c(2n+1) \cdot x_2(n+k')] +$$

$$\sum_{odd, n=1}^{511} [c(2n) \cdot x_3(n+k') + c(2n+1) \cdot x_0(n+1+k')]$$

where the correlator index may be redefined as k'=0, 1, ..., K/2−1. Notice in the second equation the time advanced sample set of $x_0(n+1)$. In this case the correlators operate with three consecutive samples per cycle.

Example L1 Correlator Implementation for One Sample/Chip

In this mode multiple-mode correlator 214 may be supplied four samples on every other cycle. Multiple-mode correlator 214 may break into subsets on each cycle. For the even cycles the $x_0(n)$, $x_1(n)$, and $x_2(n)$ values are assign to the respective inputs. On the odd cycles, $x_0(n)$, $x_1(n)$, and $x_2(n)$ values are reassigning to the inputs of $x_2(n)$, $x_3(n)$, and $x_0(n+1)$, which may be effectively an index advance of two samples. This reassignment of vector elements may be continued for the duration of the correlation.

The code chip assignments may be $c_{0,0}(n)=c(2n)$
$c_{0,1}(n)=c(2n+1)$
$c_{1,0}(n)=c(2n)$
$c_{1,1}(n)=c(2n+1)$
$c_{2,0}(n)=c(2n)$
$c_{2,1}(n)=c(2n+1)$
$c_{3,0}(n)=c(2n)$
$c_{3,1}(n)=c(2n+1)$ The sample-code multiply operations may be $m_{0,0}(n)=-x_1(n)-x_0(n)$
$m_{0,1}(n)=-x_1(n)+x_0(n)$
$m_{0,2}(n)=+x_1(n)-x_0(n)$
$m_{0,3}(n)=+x_1(n)+x_0(n)$
$m_{1,0}(n)=-x_2(n)-x_1(n)$
$m_{1,1}(n)=-x_2(n)+x_1(n)$
$m_{1,2}(n)=+x_2(n)-x_1(n)$
$m_{1,3}(n)=+x_2(n)+x_1(n)$
$m_{2,0}(n)=m_{0,0}(n)$
$m_{2,1}(n)=m_{0,1}(n)$
$m_{2,2}(n)=m_{0,2}(n)$
$m_{2,3}(n)=m_{0,3}(n)$
$m_{3,0}(n)=m_{1,0}(n)$
$m_{3,1}(n)=m_{1,1}(n)$
$m_{3,2}(n)=m_{1,2}(n)$
$M_{3,3}(n)=m_{1,3}(n)$ After the two values are added, the result may be scaled by 0.5 to fit back into a 6-bit range.

Recall that the code sequence to each correlator portion may be aligned with the enable signal. In group 604-0 and 604-1 correlator portions are enabled over the same interval, and then group 604-2 and 604-3 correlator portions follow 64 cycles later. The accumulator enable signals may be $e_{0,k''}(n)=u(n-k'')-u(n-k''-512)$
$e_{1,k''}(n)=u(n-k'')-u(n-k''-512)$
$e_{2,k''}(n)=u(n-k''-64)-u(n-k''-576)$
$e_{3,k''}(n)=u(n-k''-64)-u(n-k''-576)$ This mode may, for example, use a 128-tap TDL for the enable signals and also one for the code sequence. Groups 604-0 and 604-1 may connect to the first 64 taps, and groups 604-2 and 604-3 may connect to the last 64 taps. Therefore, the total number of cycles to perform 256 correlations may be 512+128=640 cycles.

The correlator index numbers may be

Group 504-0 may be y(0), y(2), ..., y(126)
Group 504-1 may be y(1), y(3), ..., y(127)
Group 504-2 may be y(128), y(130), ..., y(254)
Group 504-3 may be y(129), y(131), ..., y(255)

Thus the results may be placed in the correct order by interlacing results from groups 604-0 and 604-1, interlacing results from groups 604-2 and 604-3, and then concatenating such together.

Example L1 Code Generator

Figure 8:
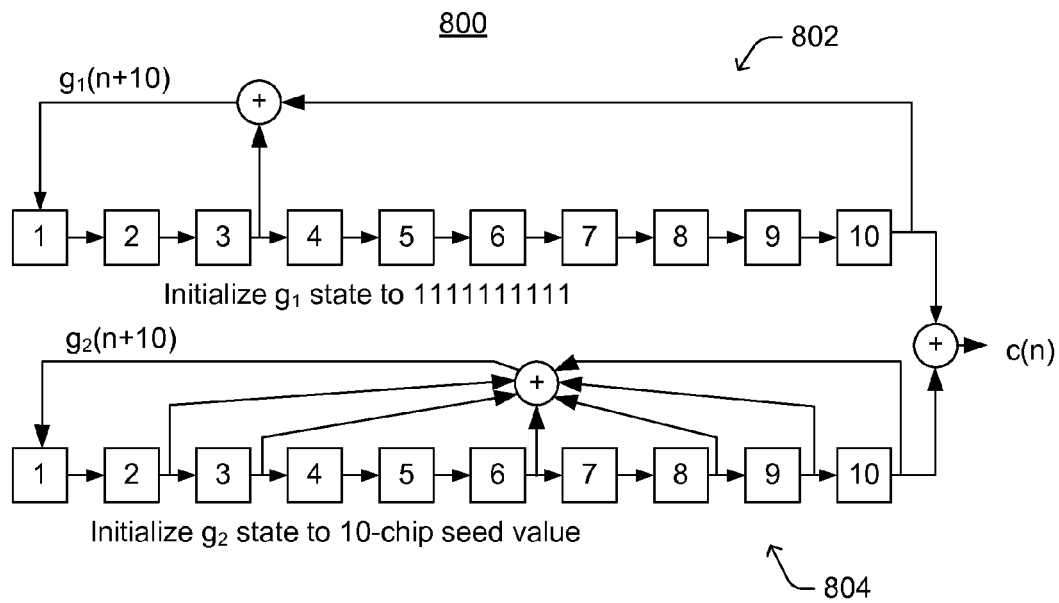
FIG. 8 is a schematic block diagram illustrating certain further features an exemplary code generator, for example, as in FIG. 6, in accordance with an implementation.

As illustrated in the example shown in FIG. 8, an L1 code generator 800 may be composed of two linear feedback shift registers (LFSR) 802 and 804, each of length 10. Basically, a LFSR may be a 1-bit shift register of length N, where the specified outputs of some stages are modulo-2 added together, and the result may be fed back to the first stage input. The register performs a shift right on every cycle. The output of length 10 LFSR will produce a unique, pseudo random noise (PRN) sequence of 1023 chips, and then repeat indefinitely if allowed.

In the example L1 code generator 800, the outputs of two LFSR 802 and 804 are modulo-2 added together to form a Gold code. For the first LFSR 802, $g_1$, all stages are initialized to the logic 1 state. The second LFSR 804, $g_2$, may be initialized to a seed value which may be unique to an SV number. The seed MSB may be applied to stage 1, down to the seed LSB applied to stage 10. Thus the code generator output has a unique sequence of 1023 chips for each SV number.

The finite field polynomials for $g_1$ and $g_2$ may be specified as $$g_1(x)=1+x^3+x^{10}$$

$$g_2(x)=1+x^2+x^3+x^6+x^8+x^9+x^{10}$$

Such code generator may only produce 1 chip for every clock cycle of the shift register. If needed, for example, 2 consecutive chips may be produced on every clock cycle by having registers that may be shifted by two stages per cycle. The input to the second stage, with notation of $g_1(2n+10)$, may be the same as the previous 1-chip per cycle design; while the input to the first stage, $g_1(2n+11)$, may be an advanced version, and thus it may be implemented by addition of stages 2 and 9. The same relationships apply to the $g_2$ shift register. Such techniques and others like them are known.

Example L1 Wideband Correlation Modes

A multiple-mode correlator 214 may be enabled to support certain variations of a wideband process on the L1 signal band. For example, a wideband correlator mode (L1__20) operates at a 20 spc sample rate and it processes all samples. Such a mode may offer a slight improvement in sensitivity and more importantly a much better ability to detect multipath signals, in certain instances.

Example L1 Wideband Correlation Implementation

For an L1 Wideband correlation implementation, the general equation for correlation of a sample sequence x(n) with code sequence c(n) at 20 spc rate and over 1023 chip length is $$y(k) = \sum_{m=0}^{1022} \sum_{n=0}^{19} c(m) \cdot x(20m + n + k)$$

Since there are 20 samples per chip and BPSK modulation, the CMF may be $H_m(z)=1+z^{-1}+\ldots+z^{-19}$. The CMF may be performed in the Baseband Processor. When factoring out CMF the equation reduces to $$y(k) = \sum_{m=0}^{1022} c(m) \cdot x(20m + k)$$

This greatly reduces the amount of computation by 1/20.

It may be convenient to use a poly-phase notation to represent the signal in 20 sampling phases. The sample phases may be defined as $x_p(n)=x(20n+p)$, where the index p may be the sample phase number; p=0 may be the first sample and p=19 may be the last. With this notation definition the correlation equation may be transformed into $$y(20k' + p) = \sum_{n=0}^{1022} c(n) \cdot x_p(n + k')$$

One possible constraint of this design may be that 20k'+p may be less than or equal to K−1 (which may be 255).

For implementation, it should be recognized that the example design supports four correlation groups and four sample phases, not 20 as shown in the previous equation. Hence, each correlator portion may access one of five sample vectors (active every 5 cycles). This leads to example equations for implementation of $$y(4k'') = \sum_{n=0}^{1022} c(n) \cdot x_0(5n + k'')$$

$$y(4k'' + 1) = \sum_{n=0}^{1022} c(n) \cdot x_1(5n + k'')$$

$$y(4k'' + 2) = \sum_{n=0}^{1022} c(n) \cdot x_2(5n + k'')$$

$$y(4k'' + 3) = \sum_{n=0}^{1022} c(n) \cdot x_3(5n + k'')$$

where the correlator index may be redefined as k''=0, 1, . . . , K/4−1. Now each correlator portion only processes every 5th sample.

Example L1 Wideband Correlator Implementation

Both wideband correlation modes may use the same code (L1-C/A) as the narrow band modes; however in these modes the code generator may be the type that produces 1 chip output. The two chip generator as in L1__2 and L1__1 modes may be not be useful. To simplify certain example implementations, a 1 chip generator may be instantiated alongside the 2 chip generator, and possibly not shared.

The hardware description may be summarized as follows; using a shorter notation based on the accumulator group number index, the subscript b, where b=0, 1, 2 and 3.

The code chip assignments may be defined as $c_{b,0}(n)=c([n/5])$ $c_{b,1}(n)=0$ where the brackets [ ] indicate an integer operation (truncate the fraction). In this mode the code generator may be advanced every 5 cycles.

The sample-code multiply operations may be $m_{b,0}(n)=-x_b(n)$ $m_{b,1}(n)=+x_b(n)$ $m_{b,2}(n)=0$ $m_{b,3}(n)=0$ The accumulators may be enabled every 5 cycles and staggered in time. Thus, an accumulator enable signals may be defined as $$e_{b,k''}(n) = \sum_{i=0}^{1022} \delta(n - 5i - k'')$$

where (n) may be the unit sample function, defined as (n)=1 when n=0, and 0 otherwise. The total number of cycles to perform 256 correlations may be 5*1023+64=5179 cycles.

The correlator index numbers may be

Group 504-0 may be y(0), y(4), . . . , y(252)
Group 504-1 may be y(1), y(5), . . . , y(253)
Group 504-2 may be y(2), y(6), . . . , y(254)
Group 504-3 may be y(3), y(7), . . . , y(255)

The correlation results may be placed in the correct order by interlacing the groups.

Example GPS L5 Correlation Modes

In certain example implementations, certain GPS L5 correlation modes may be supported. For example, an L5__2 mode supports the GPS L5 signal at 2 spc. The signal characteristics are QPSK modulation at a chip rate of 10.23 Mcps with a length 10230 ranging code, which may be a 1.0 ms code duration. The signal consists of two components, a BPSK data signal (I5) and BPSK pilot signal (Q5), each with independent code chip sequences. The pilot and data signals are in phase quadrature, with data signal on the I (in phase) component and pilot signal on the Q (quadrature) component. The Q5 carrier lags I5 carrier by 90 degrees. The pilot signal has a 20-bit Neuman-Hofman code which may be modulo-2 added to the pilot ranging code at a rate of 1.0 kHz. The data signal may be modulo-2 addition of the data ranging code and the navigation message data. The data message may be at 50 bps, and it may be rate one-half convolutionally encoded for a symbol rate of 100 sps. These symbols are further expanded by modulo-2 sum of a 10-bit Neuman-Hofman code for an effective symbol rate of 1000 sps.

Example GPS L5 Correlation Implementation for Pilot or Data Channels

An example L5 Correlation implementation for pilot or data channels is almost the same as L1 correlation at 2 spc. The only difference is the correlation length is 10230 chips, or 10 times longer than L1. In the L5 mode, as in the L1 mode, a multiple-mode correlator 214 may be enabled to process 2 chips worth of samples (4 samples) per sum iteration. Hence the number of iteration may be 10230/2=5115. Since 10230 is exactly divisible by 2, there are no extra chip and sample processed as in the L1 case. Given the similarities between L1 and L5 correlations, one may directly define the equations for L5 correlator implementation as, $$y(4k'') = \sum_{n=0}^{5114} c(2n) \cdot x_0(n+k'') + c(2n+1) \cdot x_2(n+k'')$$

$$y(4k''+1) = \sum_{n=0}^{5114} c(2n) \cdot x_1(n+k'') + c(2n+1) \cdot x_3(n+k'')$$

$$y(4k''+2) = \sum_{n=0}^{5114} c(2n) \cdot x_2(n+k'') + c(2n+1) \cdot x_0(n+1+k'')$$

$$y(4k''+3) = \sum_{n=0}^{5114} c(2n) \cdot x_3(n+k'') + c(2n+1) \cdot x_1(n+1+k'')$$

where the correlator index may be defined as k''=0, 1, . . . , K/4−1. The equations apply to either the pilot or data channel. The code sequences are unique per pilot and data channel. One may substitute either the Q5 pilot channel code, $c_p(n)$, or the I5 data channel code, $c_d(n)$, for c(n), where $c_p(n)$ may be modulo-2 addition of the pilot signal ranging code and one bit of a Neuman-Hofman code, and $c_d(n)$ may be modulo-2 addition of the data signal ranging code, one bit of a Neuman-Hofman code, and the navigation message data bit.

The relative phase of the transmitted carrier based on data and pilot code chips may be defined as When $c_d$=0 and $c_p$=0, carrier phase may be 0 degrees
When $c_d$=0 and $c_p$=1, carrier phase may be 90 degrees
When $c_d$=1 and $c_p$=1, carrier phase may be 180 degrees
When $c_d$=1 and $c_p$=0, carrier phase may be −90 degrees In certain example implementations, when the main correlator groups are processing the pilot channel, there may be a separate correlator available to process the data channel. This may allow for continuous tracking of pilot channel for higher sensitivity, while in the same task one may also receive the data message. The data channel correlation in a hardware implementation may be $$y_d = \sum_{n=0}^{5114} c_d(2n) \cdot x_p(n+k_d) + c_d(2n+1) \cdot x_{p+2}(n+k_d)$$

where $c_d(n)$ may be the data channel code sequence, $k_d$ may be the time offset of the correlation with respect to the first pilot channel correlation, and the subscript p on $x_p(n)$ may be the sample phase index. The sampling phase index may be defined as a modulo 4 number. If the index exceeds 4 then it wraps around, and 1 may be added to the n index. For example, $x_5(n)$ may be equivalently represented as $x_1(n+1)$. The variable $k_d$ may be programmable for each task and may be in range of 0 to K/4−1. The variable p may be also programmable with possible values of p=0, 1, 2 or 3, for example.
Example GPS L5 Correlator Implementation for Pilot or Data Channels An L5 correlation mode may be implemented in a similar way as the L1 at 2 spc mode. The main differences are the correlation length may be 10 times as many chips, and there is an option to process data or pilot channel.

The code chip assignment for the separate data channel correlator may be the I5 data channel code $c_d(n)$. The code chip assignments for the correlator groups 0 through 3 are dependent on pilot or data channel mode and may be $c_{b,0}(n)=c_p(2n)$ or $c_d(2n)$
$c_{b,1}(n)=c_p(2n+1)$ or $c_d(2n+1)$ The sample-code multiply operations for the main correlator groups may be $m_{0,0}(n)=-x_2(n)-x_0(n)$
$m_{0,1}(n)=-x_2(n)+x_0(n)$
$m_{0,2}(n)=+x_2(n)-x_0(n)$
$m_{0,3}(n)=+x_2(n)+x_0(n)$
$m_{1,0}(n)=-x_3(n)-x_1(n)$
$m_{1,1}(n)=-x_3(n)+x_1(n)$
$m_{1,2}(n)=+x_3(n)-x_1(n)$
$m_{1,3}(n)=+x_3(n)+x_1(n)$
$m_{2,0}(n)=-x_0(n+1)-x_2(n)$
$m_{2,1}(n)=-x_0(n+1)+x_2(n)$
$m_{2,2}(n)=+x_0(n+1)-x_2(n)$
$m_{2,3}(n)=+x_0(n+1)+x_2(n)$
$m_{3,0}(n)=-x_1(n+1)-x_3(n)$
$m_{3,1}(n)=-x_1(n+1)+x_3(n)$
$m_{3,2}(n)=+x_1(n+1)-x_3(n)$
$m_{3,3}(n)=+x_1(n+1)+x_3(n)$ The sample-code multiply operations for the separate data channel correlator are based on the sample phase number, p=0, 1, 2 or 3; thus, $m_{d,0}(n)=-x_{p+2}(n)-x_p(n)$
$m_{d,1}(n)=-x_{p+2}(n)+x_p(n)$
$m_{d,2}(n)=+x_{p+2}(n)-x_p(n)$
$m_{d,3}(n)=+x_{p+2}(n)+x_p(n)$ Note that the sample-code multiply operations for the main correlator groups may be directly used by the separate data channel correlator for all values of p (e.g., there may be no need to compute such again, just select based on p).

The correlator index numbering order for the four groups and the separate correlator may be Group 504-0 may be y(0), y(4), . . . , y(252)
Group 504-1 may be y(1), y(5), . . . , y(253)
Group 504-2 may be y(2), y(6), . . . , y(254)
Group 504-3 may be y(3), y(7), . . . , y(255)
Optional data channel correlator $y_d$ As with certain other modes, this mode may benefit from interlacing of the correlation results of the four groups and then appending the data channel correlator result.
Example GPS L5 Correlation Implementation for Coherent Pilot and Data Channels In certain implementations, an L5 correlation for concurrent pilot and data channels may be supported. To implement this mode may, for example, the correlators (accumulators) may to be split into eight groups of 32 each. Here, four groups may process the pilot and four groups process the data channels. Thus, in certain implementations there may be 128 correlators per pilot/data channel. In certain implementations, coherent or non-coherent combining may also be implemented in software. In certain implementations, it may be possible to do separate tasks for pilot and data channels.
Example GPS L5 Code Generator Implementation An example L5 code generator may, for example, include two independent L5 code generators, one dedicated to the pilot code sequence and the other for data code sequence. For the L5 mode, the code generator may produce 2 chips per cycle. The 2 chip generator may be used in the CP, for example.

Other Example Correlation Modes and Implementations

Thus, as presented in the preceding correlation mode examples, a multiple-mode correlator, such as, multiple mode correlator 214 may be enabled to support a variety of correlation modes and tasks, and acquisition of various SPS signals. Those skilled in the art will recognize that these examples may also be extended to other SPS signals and related correlation modes and tasks While some portions of the detailed description have been presented in terms of processes or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent in this description, terms such as "processing", "computing", "calculating", "enabling", "identifying", "detecting", "obtaining", "estimating", "associating", "receiving", "transmitting" "acquiring", "providing", "storing", "accessing", "determining", or the like refer to actions or processes of a specific apparatus, such as a special purpose computer or a similar special purpose electronic computing device. In the context of this specification, therefore, a special purpose computer or a similar special purpose electronic computing device may be capable of manipulating or transforming signals, typically represented as physical electronic or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it may be intended that claimed subject matter not be limited to the particular examples disclosed, but that such claimed subject matter may also include all aspects falling within the scope of appended claims, and equivalents thereof

What is claimed is:

1. A method for use in a receiver, the method comprising:
   determining a plurality of multiply result signals in a pre-multiplier portion of a multiple-mode correlator based at least in part on multiplying input sample signals $x(n)$ with code chip signals $c(n)$;
   selecting a first one of said plurality of multiply result signals for use by a first accumulator; and
   selecting a second one of said plurality of multiply result signals for use by a second accumulator, wherein said first and second accumulators are part of a plurality of accumulators of a correlation portion of said multiple-mode correlator, said plurality of accumulators being partitioned into a plurality of groups of accumulators based at least in part on a plurality of correlation modes, and wherein said plurality of groups of accumulators comprises at least two groups of accumulators, each of said plurality of correlation modes is operatively enabled to process at least four of said input sample signal $x(n)$ per chip, each of said input sample signals $x(n)$ is split into at least four sample phases, and each of said at least two groups of accumulators independently processes one of said at least four sample phases.

2. The method as recited in claim 1, wherein said first one of said plurality of multiply result signals and second one of said plurality of multiply result signals are determined using a single pre-multiplier of said pre-multiplier portion of said multiple-mode correlator.

3. The method as recited in claim 1, wherein said first one of said plurality of multiply result signals and second one of said plurality of multiply result signals are determined using two different pre-multipliers of said pre-multiplier portion of said multiple-mode correlator.

4. The method as recited in claim 1, wherein selecting said first one of said plurality of multiply result signals for use by said first accumulator is based at least in part on said code chip signals $c(n)$.

5. The method as recited in claim 1, wherein determining said plurality of multiply result signals comprises determining all possible multiply result signals for said input sample signals $x(n)$ multiplied by said code chip signals $c(n)$.

6. The method as recited in claim 1, wherein, within at least one of said plurality of groups of accumulators, said multiply result signals are selectively staggered in time to allow each accumulator within said group of accumulators to process different sets of input sample signals $x(n)$.

7. The method as recited in claim 1, further comprising:
   with said first accumulator, accumulating said selected first ones of said plurality of multiply result signals over a first correlation length; and
   with said second accumulator, accumulating said selected second ones of said plurality of multiply result signals over a second correlation length.

8. The method as recited in claim 1, further comprising selecting at least one of said plurality of multiply result signals for use by a third accumulator of said correlation portion of said multiple-mode correlator.

9. The method as recited in claim 8, wherein said third accumulator comprises a complex accumulator operatively enabled to accumulate a plurality of multiply result signals associated with a data channel.

10. The method as recited in claim 1, further comprising: generating said code chip signals $c(n)$ associated with a plurality of satellite positioning system (SPS) signals.

11. The method as recited in claim 10, wherein generating said code chip signals $c(n)$ for at least one of said plurality of SPS signals comprises generating separate code chip signals $c(n)$ for each of a pilot and a data channel.

12. The method as recited in claim 10, wherein generating said code chip signals $c(n)$ for at least one of said plurality of SPS signals comprises generating said code chip signals $c(n)$ for at least two consecutive chips in a clock cycle.

13. The method as recited in claim 1, wherein said first one of said plurality of multiply result signals and second one of said plurality of multiply result signals are the same.

14. The method as recited in claim 1, wherein said first accumulator is operatively enabled to support a first correlation mode, and said second accumulator is operatively enabled to support a second correlation mode.

15. The method as recited in claim 14, wherein said first and second correlation modes are different.

16. The method as recited in claim 14, wherein said first correlation mode is associated with a first satellite positioning system (SPS), and said second correlation mode is associated with a second SPS.

17. The method as recited in claim 16, wherein at least one of said first and/or second SPS comprises a GNSS.

18. The method as recited in claim 14, wherein at one of said first and/or second correlation modes comprises a wideband correlation mode.

19. The method as recited in claim 1, wherein at least one of said first and/or second accumulators comprises a complex accumulator.

20. The method as recited in claim 1, wherein different sets of said multiply result signals are associated with different correlation modes.

21. An apparatus comprising:
means for determining a plurality of multiply result signals based at least in part on multiplying input sample signals x(n) with code chip signals c(n);
means for selecting a first one of said plurality of multiply result signals for use by a first accumulator means; and
means for selecting a second one of said plurality of multiply result signals for use by a second accumulator means,
wherein said first and second accumulators means are part of a plurality of accumulator means, said plurality of accumulator means being partitioned into a plurality of groups of accumulator means based at least in part on a plurality of correlation modes, and wherein said plurality of groups of accumulator means comprises at least two groups of accumulator means, each of said plurality of correlation modes is operatively enabled to process at least four of said input sample signal x(n) per chip, each of said input sample signals x(n) is split into at least four sample phases, and each of said at least two groups of accumulator means independently processes one of said at least four sample phases.

22. The apparatus as recited in claim 21, wherein said means for selecting said first one of said plurality of multiply result signals for use by said first accumulator means is operatively responsive based at least in part on said code chip signals c(n).

23. The apparatus as recited in claim 21, wherein said means for determining said plurality of multiply result signals comprises means for determining all possible multiply result signals for said input sample signals x(n) multiplied by said code chip signals c(n).

24. The apparatus as recited in claim 21, further comprising means for selectively staggering said multiply result signals in time to allow each accumulator means within said group of accumulator means to process different sets of input sample signals x(n).

25. The apparatus as recited in claim 21, further comprising:
said first accumulator means for accumulating said selected first ones of said plurality of multiply result signals over a first correlation length; and
said second accumulator means for accumulating said selected second ones of said plurality of multiply result signals over a second correlation length.

26. The apparatus as recited in claim 21, further comprising:
means for selecting at least one of said plurality of multiply result signals for use by a third accumulator means.

27. The apparatus as recited in claim 26, further comprising:
said third accumulator means for accumulating a plurality of multiply result signals associated with a data channel.

28. The apparatus as recited in claim 21, further comprising:
means for generating said code chip signals c(n), said code chip signals c(n) being associated with a plurality of satellite positioning system (SPS) signals.

29. The apparatus as recited in claim 28, further comprising:
means for generating separate code chip signals c(n) for each of a pilot and a data channel.

30. The apparatus as recited in claim 28, further comprising:
means for generating said code chip signals c(n) for at least two consecutive chips in a clock cycle.

31. The apparatus as recited in claim 21, wherein said first one of said plurality of multiply result signals and second one of said plurality of multiply result signals are the same.

32. The apparatus as recited in claim 21, wherein said first accumulator means is operatively associated with a first correlation mode, and said second accumulator means is operatively associated with a second correlation mode.

33. The apparatus as recited in claim 32, wherein said first and second correlation modes are different.

34. The apparatus as recited in claim 32, wherein said first correlation mode is associated with a first satellite positioning system (SPS), and said second correlation mode is associated with a second SPS.

35. The apparatus as recited in claim 21, wherein said first accumulating means comprises a complex accumulator.

36. The apparatus as recited in claim 32, wherein at one of said first and/or second correlation modes comprises a wideband correlation mode.

37. The apparatus as recited in claim 21, wherein different sets of said multiply result signals are associated with different correlation modes.

38. An apparatus comprising:
a multiple-mode correlator comprising:
a pre-multiplier portion operatively enabled to determine a plurality of multiply result signals based at least in part on multiplying input sample signals x(n) with code chip signals c(n);
a correlation portion comprising a plurality of accumulators, said plurality of accumulators being partitioned into a plurality of groups of accumulators based at least in part on a plurality of correlation modes; and
a selection portion coupled to said pre-multiplier portion and said correlation portion, said selection portion operatively enabled to at least select a first one of said plurality of multiply result signals for use by a first accumulator, and a second one of said plurality of multiply result signals for use by a second accumulator, and
wherein said plurality of groups of accumulators comprises at least two groups of accumulators, each of said plurality of correlation modes is operatively enabled to process at least four of said input sample signal x(n) per chip, each of said input sample signals x(n) is split into at least four sample phases, and each of said at least two groups of accumulators independently processes one of said at least four sample phases.

39. The apparatus as recited in claim 38, wherein said first one of said plurality of multiply result signals and second one of said plurality of multiply result signals are determined using a single pre-multiplier of said pre-multiplier portion of said multiple-mode correlator.

40. The apparatus as recited in claim 38, wherein said first one of said plurality of multiply result signals and second one of said plurality of multiply result signals are determined using two different pre-multipliers of said pre-multiplier portion of said multiple-mode correlator.

41. The apparatus as recited in claim 38, wherein said selection portion comprises a first multiplexer operatively enabled to select said first one of said plurality of multiply result signals for use by said first accumulator based at least in part on said code chip signals c(n).

42. The apparatus as recited in claim 38, wherein at least one pre-multiplier within said pre-multiplier portion is operatively enabled to determine all possible multiply result signals for said input sample signals x(n) multiplied by said code chip signals c(n).

43. The apparatus as recited in claim 38, wherein, within at least one of said plurality of groups of accumulators, said multiply result signals are selectively staggered in time to allow each accumulator within said group of accumulators to process different sets of input sample signals x(n).

44. The apparatus as recited in claim 38, wherein said first accumulator is operatively enabled to accumulate said selected first ones of said plurality of multiply result signals over a first correlation length, and said second accumulator is operatively enabled to accumulate said selected second ones of said plurality of multiply result signals over a second correlation length.

45. The apparatus as recited in claim 38, wherein said plurality of accumulators further comprises at least a third accumulator, said third accumulator being a complex accumulator operatively enabled to accumulate a plurality of multiply result signals associated with a data channel.

46. The apparatus as recited in claim 38, further comprising:
a code generator coupled to at least said pre-multiplier portion and operatively enabled to generate said code chip signals c(n), wherein said code chip signals c(n) are associated with a plurality of satellite positioning system (SPS) signals.

47. The apparatus as recited in claim 46, wherein said code generator is operatively enabled to generate separate code chip signals c(n) for each of a pilot and a data channel.

48. The apparatus as recited in claim 46, wherein said code generator is operatively enabled to generate said code chip signals c(n) for at least two consecutive chips in a clock cycle.

49. The apparatus as recited in claim 38, wherein said first one of said plurality of multiply result signals and second one of said plurality of multiply result signals are the same.

50. The apparatus as recited in claim 38, wherein said first accumulator is operatively enabled to support a first correlation mode, and said second accumulator is operatively enabled to support a second correlation mode.

51. The apparatus as recited in claim 50, wherein said first and second correlation modes are different.

52. The apparatus as recited in claim 50, wherein said first correlation mode is associated with a first satellite positioning system (SPS), and said second correlation mode is associated with a second SPS.

53. The apparatus as recited in claim 52, wherein at least one of said first and/or second SPS comprises a GNSS.

54. The apparatus as recited in claim 50, wherein at one of said first and/or second correlation modes comprises a wideband correlation mode.

55. The apparatus as recited in claim 38, wherein at least one of said first and/or second accumulators comprises a complex accumulator.

56. The apparatus as recited in claim 38, wherein different sets of said multiply result signals are associated with different correlation modes.

57. An article comprising:
a non-transitory computer-readable medium having computer implementable instructions stored thereon that are executable by one or more processing units of a computing device to operatively enable the computing device to:
operatively enable a pre-multiplier portion of a multiple-mode correlator to determine a plurality of multiply result signals based at least in part on multiplying input sample signals x(n) with code chip signals c(n); and
operatively enable a selection portion of said multiple-mode correlator to at least select a first one of said plurality of multiply result signals for use by a first accumulator, and a second one of said plurality of multiply result signals for use by a second accumulator, wherein said first and second accumulators are part of a plurality of accumulators of a correlation portion of said multiple-mode correlator, said plurality of accumulators being partitioned into a plurality of groups of accumulators based at least in part on a plurality of correlation modes, and
wherein said plurality of groups of accumulators comprises at least two groups of accumulators, each of said plurality of correlation modes is operatively enabled to process at least four of said input sample signal x(n) per chip, each of said input sample signals x(n) is split into at least four sample phases, and each of said at least two groups of accumulators independently processes one of said at least four sample phases.

58. The article as recited in claim 57, wherein said first one of said plurality of multiply result signals and second one of said plurality of multiply result signals are determined using a single pre-multiplier of said pre-multiplier portion of said multiple-mode correlator.

59. The article as recited in claim 57, wherein said first one of said plurality of multiply result signals and second one of said plurality of multiply result signals are determined using two different pre-multipliers of said pre-multiplier portion of said multiple-mode correlator.

60. The article as recited in claim 57, wherein said selection portion comprises a first multiplexer operatively enabled to select said first one of said plurality of multiply result signals for use by said first accumulator based at least in part on said code chip signals c(n).

61. The article as recited in claim 57, wherein at least one pre-multiplier within said pre-multiplier portion is operatively enabled to determine all possible multiply result signals for said input sample signals x(n) multiplied by said code chip signals c(n).

62. The article as recited in claim 57, wherein, within at least one of said plurality of groups of accumulators, said multiply result signals are selectively staggered in time to allow each accumulator within said group of accumulators to process different sets of input sample signals x(n).

63. The article as recited in claim 57, wherein said first accumulator is operatively enabled to accumulate said selected first ones of said plurality of multiply result signals over a first correlation length, and said second accumulator is operatively enabled to accumulate said selected second ones of said plurality of multiply result signals over a second correlation length.

64. The article as recited in claim 57, wherein said plurality of accumulators further comprises at least a third accumulator, said third accumulator being a complex accumulator operatively enabled to accumulate a plurality of multiply result signals associated with a data channel.

65. The article as recited in claim 57, further comprising computer implementable instructions that are executable by the one or more processing units of the computing device to:
operatively enable a code generator coupled to at least said pre-multiplier portion and operatively enabled to generate said code chip signals c(n), wherein said code chip signals c(n) are associated with a plurality of satellite positioning system (SPS) signals.

66. The article as recited in claim 65, wherein said code generator is operatively enabled to generate separate code chip signals c(n) for each of a pilot and a data channel.

67. The article as recited in claim 65, wherein said code generator is operatively enabled to generate said code chip signals c(n) for at least two consecutive chips in a clock cycle.

68. The article as recited in claim 57, wherein said first one of said plurality of multiply result signals and second one of said plurality of multiply result signals are the same.

69. The article as recited in claim 57, further comprising computer implementable instructions that are executable by the one or more processing units of the computing device to:
operatively enable said first accumulator to support a first correlation mode, and said second accumulator to support a second correlation mode.

70. The article as recited in claim 69, wherein said first and second correlation modes are different.

71. The article as recited in claim 69, wherein said first correlation mode is associated with a first satellite positioning system (SPS), and said second correlation mode is associated with a second SPS.

72. The article as recited in claim 69, wherein at one of said first and/or second correlation modes comprises a wideband correlation mode.

73. The article as recited in claim 57, wherein at least one of said first and/or second accumulators comprises a complex accumulator.

74. The article as recited in claim 57, wherein different sets of said multiply result signals are associated with different correlation modes.

* * * * *